R. P. BEALS.
Bayonet-Fastenings.

No. 152,320. Patented June 23, 1874.

Witnesses,
M. J. Foley
C. E. Buckland.

Inventor,
Robert P. Beals.
By J. A. Curtis,
his Atty.

UNITED STATES PATENT OFFICE.

ROBERT P. BEALS, OF SPRINGFIELD, MASSACHUSETTS.

IMPROVEMENT IN BAYONET-FASTENINGS.

Specification forming part of Letters Patent No. 152,320, dated June 23, 1874; application filed May 7, 1874.

*To all whom it may concern:*

Be it known that I, ROBERT P. BEALS, of Springfield, in the State of Massachusetts, have invented a new and useful Improved Bayonet-Fastening; and I do hereby declare that the following is a full, clear, and exact description thereof, reference being had to the accompanying drawings making a part of this specification, and to the letters of reference marked thereon, in which—

Figure 1:
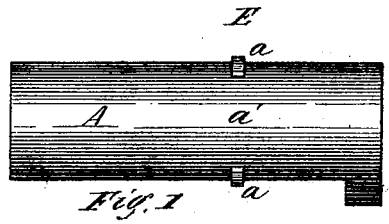
Figure 2:
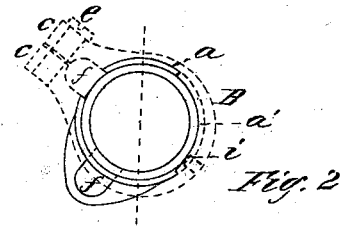
Figure 3:
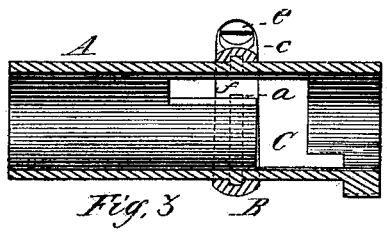
Figure 4:
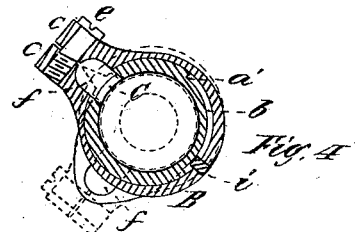
Figure 5:
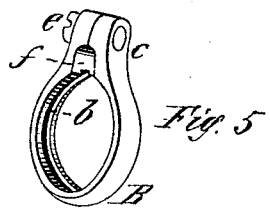

Figure 1 is a side view of a bayonet-socket arranged to have my invention applied thereto. Fig. 2 is an end view of the same. Fig. 3 is a longitudinal section of the same, at line D. Fig. 4 is a transverse section, at line E; and Fig. 5 is a perspective view of the clasp.

My invention relates to a device for securing a bayonet-socket to the end of a gun-barrel; and it consists of an annular projection extending partially around the exterior of the bayonet-socket, with a circular clasp extending around or grasping the socket, with a groove or channel made upon the inside of the clasp, into which the annular projection is fitted, and with a pin or projection in the clasp, which strikes against the two ends of the annular projection, where the latter is cut away to allow the clasp to partially rotate upon the shank in attaching the bayonet to, or detaching it from, the gun-barrel.

In the drawings, A is the socket of the bayonet, the bore of which is made to fit the exterior of the gun-barrel; and upon the exterior of the socket A is made the annular projection $a$, a portion of which is cut away at $a'$, leaving the ends of the same blunt or square. A clasp, B, is made of suitable width and of sufficient size to encircle the socket A, and is provided with two ears, $c$, which are held together or loosened by a screw, $e$. These ears have an open space, $f$, between them, next to the socket, of sufficient size for the gun-sight to pass through; and a groove or channel, $b$, is made on the inside of the clasp, into which fits the annular projection $a$, but sufficiently loose for the clasp to turn freely upon the socket; and a pin, $i$, is inserted into the clasp, its inner end projecting into the groove $b$ of the clasp; and this pin may be screwed into the clasp, so that it will not be liable to become lost out.

The screw may be removed from the ears $c$, and the two ears are held apart, so that the clasp may be placed upon the socket with the annular projection $a$, in the channel or groove $b$, and the pin located between the ends of the projection $a$, where the latter is cut away at $a'$. The screw $e$ is then turned into its holes in the ears $c$ of the clasp, until the latter grasps the socket sufficiently tight to stay in place well, and yet be moved around the socket by the hand easily, and the device is then complete for use.

To attach the bayonet to the gun-barrel, the clasp is turned, with its ears $c$, into the position shown in dotted lines in Fig. 4, and the socket is placed upon the gun-barrel, the sight of the latter passing into the slot C, through the opening $f$ of the clasp, and into the inner end of said slot. The clasp is then turned into the position shown in dotted lines in Fig. 2, and in black lines in Fig. 4, the clasp B then bearing against the gun-sight and preventing the socket from being forced off the gun-barrel.

As the clasp is moved to and fro upon the barrel, in the operations of attaching the bayonet to and detaching it from the barrel, the movement of the clasp is limited by the pin $i$ striking against the ends of the annular projection $a$ at $a'$, where said projection is cut away.

The clasp is made a little wider opposite the ears $c$, in the ordinary manner, so that, as the clasp is turned upon the socket to secure the latter to the gun-barrel, the edge of the clasp has a firm bearing against the sight, or cams up against it, to hold the socket firm to the barrel.

It is believed that this device can be manufactured much cheaper than the ordinary bayonet-clasp, and is much firmer and more true in its movements, and safer in its operation.

Having thus described my invention, what I claim as new is—

An improved bayonet-fastening, consisting of the socket A, provided with the projection $a$ upon its exterior, in combination with the clasp B, having the groove $b$ and pin $i$, arranged therein, substantially as described.

ROBERT P. BEALS.

Witnesses:
T. A. CURTIS,
C. E. BUCKLAND.